United States Patent [19]

Janusch

[11] 4,360,487
[45] Nov. 23, 1982

[54] PROCESS FOR HOT BRIQUETTING OF ORGANIC SOLID MATERIALS

[75] Inventor: Alois Janusch, Leoben-Seegraben, Austria

[73] Assignee: Voest-Alpine Aktiengesellschaft, Vienna, Austria

[21] Appl. No.: 205,506

[22] Filed: Nov. 10, 1980

[30] Foreign Application Priority Data

Nov. 15, 1979 [AT] Austria ............................. 7301/79

[51] Int. Cl.³ ............................................. B28B 3/14
[52] U.S. Cl. ..................................... 264/101; 264/109; 264/117; 264/DIG. 51
[58] Field of Search ........ 264/101, 109, 117, DIG. 51

[56] References Cited

U.S. PATENT DOCUMENTS 3,231,649  1/1966  Pfeiffer ................................. 264/109

FOREIGN PATENT DOCUMENTS 496680  12/1938  United Kingdom .

Primary Examiner—James R. Hall
Attorney, Agent, or Firm—Cushman, Darby & Cushman

[57] ABSTRACT

For the purpose of briquetting organic solid materials, such as brown coal or bituminous coal, the materials are heated by hot water and/or steam and under super-atmospheric pressure to temperatures exceeding 160° C. After discharging the organic solid materials, which have become dried to a great extent, the generated steam is separated by sucking off the steam without substantially cooling effect, bitumen-forming substances present within the organic solid materials thereby rapidly becoming homogeneously distributed. These homogeneously distributed binding agents give the compressed briquettes obtained a high strength and good mechanical properties when using substantially reduced compacting pressures as compared with known briquetting processes.

10 Claims, 1 Drawing Figure

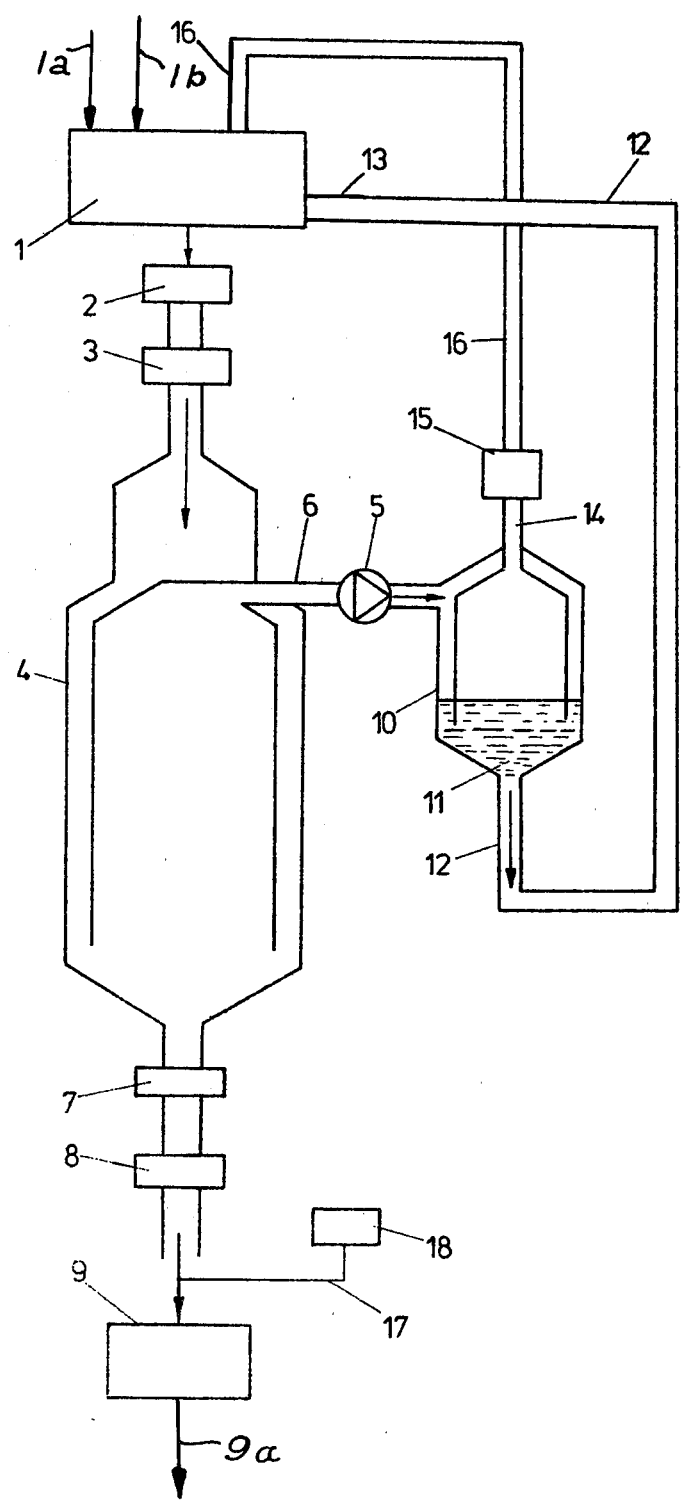

PROCESS FOR HOT BRIQUETTING OF ORGANIC SOLID MATERIALS

The present invention refers to a process for hot-briquetting of organic solid materials, particularly of brown coal or of bituminous coals. While some organic solid materials can, provided that they contain sufficient binding agent, be compacted under pressure to briquettes without difficulties, some other organic solid materials can only be difficultly brought into the shape of briquettes. There are already known experiments to heat coals for the purpose of briquetting same to such an extent that they assume a plastic condition. Whether organic solid materials can be briquetted at all essentially depends on the chemical constitution of the material to be briquetted and on the physical nature of the material to be briquetted and, in the case of hot briquetting, on the speed of heating of the material to be briquetted, the briquetting temperature, the pressure applied and the duration of the pressure action. A plastic condition of the material to be briquetted can only be obtained with material to be briquetted having a high content in bitumen or bitumen-forming materials and it is for this reason that the petrographic composition of coal to be briquetted is of particular importance. A considerable difficulty on hot briquetting of organic solid material has its origin in the fact that the decomposition temperature of organic solid materials comes very close to that temperature at which the organic solid materials to be briquetted assume a plasticity favourable for briquetting. Tests were already made for determining the influence of the degree of ageing of coal on its plasticity and on the range of its plastic condition. During these tests it has been found that the softening point of coal is pronouncedly depending on the heating speed. If the temperature is too low at the beginning of the briquetting operation, the plasticity is insufficient and the advantage of only low pressures being required when briquetting is effected in a plastic condition can not be made use of. With excessively high temperatures, the bitumen is already decomposed so that the binding property of the coal is substantially reduced. The useable temperature range for hot briquetting is thus extremely narrow.

Tests performed up till now for hot briquetting organic solid materials have, particularly when briquetting brown coals, not resulted in satisfactory products. While hot briquetting of bitumenous coal performed with rapid heating particulate bituminous coal gave substantially satisfying results, hot briquetting of brown coal has up till now not resulted in satisfying products.

In the GB-PS (British Patent Specification) 496 680 there is described a process according to which coals of younger geologic age are prior to briquetting under pressure heated to temperatures above 100° C., particularly to temperatures within the range of 130° to 300° C., under a pressure exceeding atmospheric pressure (super-atmospheric pressure). Pressing operation, however, was effected under said super-atmospheric pressure immediately subsequent to said heating with the purpose to prevent decomposition products from evaporating.

The present invention is in particular based on such a process for hot briquetting of organic solid materials, particularly of brown coal or bituminous coal, in which the organic solid materials are heated to temperatures exceeding 160° C. and under super-atmospheric pressure by means of hot water and/or steam, respectively, under the conditions of a drying process and are, after discharging from the heating zone via a lock and after separating the steam, immediately subsequently compacted under pressure to briquettes, thereby maintaining a temperature exceeding 160° C., and the invention aims at the production of briquettes of high strength by applying compacting pressures being as low as possible. For solving this task, the process according to the invention essentially consists in that the organic solid materials are, after having been discharged and prior to pressing into briquettes, exposed to sub-atmospheric pressure thereby separating the steam by sucking off the steam. In view of the organic solid materials being, after having been discharged and prior to becoming pressed to briquettes, subjected to a sub-atmospheric pressure, the fact that bitumen-forming materials having their critical temperature located above the process temperature are decomposed with a lower speed under a higher pressure is, above all, taken into consideration. In view of the pre-treatment of the organic solid materials under super-atmospheric pressure and at a temperature exceeding 160° C., the process according to the invention results in a plastic condition of the solid organic materials. The desired plasticity can, under the conditions selected, be obtained at essentially lower temperatures than would be the case when rapidly heating the solid organic materials under conditions not corresponding to a drying process. This phenomenon is particularly ascribed to some sort of activated condition of the organic solid materials coming from such a drying stage with respect to their plasticity, which activated condition would be lost after cooling and after lapse of some time by ageing phenomena. The temperature range reaching till the beginning of decomposition becomes thus essentially greater and any losses by decomposition phenomena on hot briquetting can substantially be reduced by heating the organic solid materials under the conditions of a drying process. While, when heating organic solid materials which a high speed of temperature increase, for example when heating coal in a stream of a carrier gas, the difference between the softening point and the beginning of decomposition reactions of organic solid materials, for example coal, is frequently only 10° C., this temperature difference frequently assumes a value of more than 100° C. when heating the organic solid materials under the conditions of a drying process. This effect can substantially be enhanced when subjecting the pretreated solid organic materials to a sub-atmospheric pressure immediately prior to compacting same to briquettes, such sub-atmospheric pressure resulting in a rapid and homogeneous distribution of the bitumen-forming materials in the activated condition. Simultaneously, the steam generated is sucked off so that the temperature can rapidly be increased from the drying temperature to a temperature favourable for the briquetting operation so that the plasticity achieved in the drying stage is fully maintained.

The organic solid materials are, according to an advantageous embodiment, heated to a temperature within the range of 160° to 420° C. prior to becoming compacted by pressure, the temperature loss occurring when discharging the organic solid materials and when separating the steam being, if required, compensated by heating the particulate organic solid materials within a fluidized bed by hot gasses or superheated steam and adjusting the temperature of the organic solid materials to a value within the range of 160° to 420° C. It is an essential advantage of the process according to the invention that satisfying results are obtained over a wide temperature range and by applying a relatively low compacting pressure whereas in the known processes for hot briquetting only minor deviations from an optimum temperature have an unfavourable effect on the process. Minor deviations from the temperature of beginning plastification immediately result with the known processes in a more or less considerable inhomogenity of the briquettes. In the process according to the invention, the quality of the briquettes obtained can further be improved by, and this is a preferred further development of the process according to the invention, centrifugeing the organic solid materials under super-atmospheric steam pressure prior to hot briquetting operation. Such centrifugeing results in homogenizing the particulate organic solid materials to be briquetted and makes it possible to work under comparably low compacting pressures. Compacting of the solid materials to briquettes is preferably effected under pressures within the range of 3000 to 10,000 N/cm$^2$.

The process according to the invention can substantially be economized by purifying the steam sucked off from the organic solid materials, thereby removing dust particles, then compressing the steam and then supplying the compressed steam under a super-atmospheric pressure to the organic solid materials for heating and drying same. In this manner, the hot steam can be circulated within a closed circuit and the amount of energy required for heating the organic solid materials to their briquetting temperature can be reduced. Preferably, the mixture of water and solid materials obtained in the mentioned purification step can, in this case, be supplied to the organic solid materials for heating the same prior to the drying step. Separation of a mixture of water and solid particles from the vapour phase results in a reduction of the wear of the steam compressor and the mixture of water and solid materials can, in a simple manner, be supplied to the drying stage via locks or the like. Heating and drying of the organic solid materials is preferably effected under pressure up to 40 bar.

For obtaining briquettes of, as far as possible, constant quality, it is of advantage to use organic solid materials with a maximum particle size of 5 mm. An equalization of the particle size as well an increased mobility of the bitumen can particularly be achieved when centrifuging the heated organic solid materials in the mentioned manner.

In those cases in which the content of the organic solid material in bitumen or bitumen-forming substances, respectively, is insufficient to guarantee a sufficient plasticity at the softening temperature, a binding agent preferably heated to 160° to 420° C. can, according to the invention, be added prior to the hot briquetting operation. It has been shown, that such binding agents need only be added to organic solid materials which up till now could not be briquetted at all. At any rate, organic solid materials necessitating an addition of a binding agent for being formed to briquettes according to known processes can be briquetted according to the process according to the invention without any addition of binding agents.

The organic solid materials are maintained under compacting pressure preferably for a time interval of at least 5 s (seconds) and are, also preferably, already cooled while being compacted. Not all usual presses are suitable for maintaining a compacting pressure for at least 1 min (minute). In view of the fact that relatively low compacting pressures are sufficient in the process according to the invention, it is also possible to use extruders.

For preventing the organic solid materials from losing their plasticity during the process, the solid materials are, after having been heated and prior to becoming compacted to briquettes, preferably maintained in each process step at a temperature of at least 100° C.

It is an essential advantage of the hot briquetting process according to the invention that coal unsuitable for being coked can be used in a proportion up to approximately 70%. However, it is without further possible, to subject the briquettes obtained to a coking operation immediately after the briquetting operation and without any cooling.

In the following, the process according to the invention is further illustrated with reference to the drawing illustrating the process according to the invention by a flow chart.

Reference numeral 1 indicates a drying stage operated with hot water or hot steam supplied through a line 1a and optionally comprising a centrifuge operated under steam pressure but not being shown. Organic solid material is supplied to the drying stage 1 through a conduit 1b. Drying can without further be effected in several steps. The pre-dried material is transferred from the drying stages into a reactor 4 maintained under sub-atmospheric pressure via a twin-lock 2, 3. Steam is sucked out of the reactor 4 by means of a sucking blower 5 via a conduit 6 and the material depleted in steam is, via a twin-lock 7, 8, transferred into the hot buiquetting stage 9. Briquettes produced in stage 9 are discharged at 9a. The steam sucked off via the conduit 6 is fed to a purification stage 10 from the lower end of which a mixture 11 of water and solid material is discharged via a conduit 12. The mixture 11 of water and solid material is recycled into the drying stage 1 at 13. The purified steam is removed from the purification stage 10 via a conduit 14 and compresed by a compressor 15 to the operating pressure of the drying stage 1. The compressed steam is recycled to the drying stage via the conduit 16. If desired or necessary, bitumen stored in a container 18 can be added to the material to be processed within the hot briquetting stage 9 via a conduit 17. The container 18 can, in a manner not shown, be pre-heated to briquetting temperature, for example by means of process steam, for correspondingly heating therein the bitumen.

What is claimed is:

1. In a process for hot briquetting particulate organic solid materials selected from the group consisting of brown coal and bituminous coal which includes drying and heating the materials in a treatment zone under superatmospheric pressure by treatment at temperatures exceeding 160° C. with a fluid selected from the group consisting of hot water and steam thereby generating steam, discharging the materials from the treatment zone, separating steam from the materials and pressing the materials into briquettes while maintaining a temperature exceeding 160° C., the improvement comprising exposing the materials after discharging from the treatment zone and before pressing to subatmospheric pressure to thereby separate steam from the materials and sucking off the steam.

2. A process as in claim 1 including purifying the steam sucked off from the materials by separating a mixture of solids and water from the steam, compressing purified steam and supplying the purified steam to said treatment zone under superatmospheric pressure for heating and drying the materials in said treatment zone.

3. A process as in claim 2 wherein the mixture of solids and water is supplied to the organic solid materials prior to drying and heating same.

4. A process as in claim 1 wherein temperature loss occurring when discharging the materials from the treatment zone and when separating steam from the materials is compensated by heating the materials with heated gaseous fluid within a fluidized bed at a temperature in the range 160° C. to 420° C.

5. A process as in claim 1 wherein the superatmospheric pressure in said treatment zone is up to 40 bar.

6. A process as in claim 1 wherein the particulate organic solid materials has a maximum particle size of 5 mm.

7. A process as in claim 1 including adding binding agents to the organic solid materials prior to briquetting.

8. A process as in claim 7 wherein the binding agents are heated to 160° C.–420° C.

9. A process as in claim 1 wherein the drying and heating step includes a centrifuging operation.

10. A process as in claim 1 wherein pressing is effected at 3000 $N/cm^2$ to 10,000 $N/cm^2$.

* * * * *